US009469486B2

(12) United States Patent
German

(10) Patent No.: US 9,469,486 B2
(45) Date of Patent: Oct. 18, 2016

(54) RIGHT ANGLE TRANSFER

(71) Applicant: Dematic Corp., Grand Rapids, MI (US)

(72) Inventor: Harry Thad German, Belding, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 14/819,603

(22) Filed: Aug. 6, 2015

(65) Prior Publication Data

US 2016/0046451 A1 Feb. 18, 2016

Related U.S. Application Data

(60) Provisional application No. 62/037,800, filed on Aug. 15, 2014.

(51) Int. Cl.
*B65G 47/54* (2006.01)

(52) U.S. Cl.
CPC .................. *B65G 47/54* (2013.01)

(58) Field of Classification Search
CPC .............................. B65G 47/54; B65G 47/53
USPC .................. 198/370.09, 370.1, 809
See application file for complete search history.

(56) References Cited

U.S. PATENT DOCUMENTS

| 3,627,100 A | * | 12/1971 | Bourbina | ............... | A21C 9/083 |
| | | | | | 198/412 |
| 4,144,960 A | * | 3/1979 | Scourtes | .............. | B23Q 7/1431 |
| | | | | | 198/346.1 |
| 4,541,520 A | | 9/1985 | Greenlee, III | | |
| 4,730,718 A | * | 3/1988 | Fazio | ..................... | B65G 47/54 |
| | | | | | 198/370.1 |
| 4,926,999 A | | 5/1990 | Fauth, Sr. et al. | | |
| 4,962,841 A | * | 10/1990 | Kloosterhouse | ....... | B65G 47/54 |
| | | | | | 198/370.09 |
| 5,947,259 A | * | 9/1999 | Leisner | .................. | B65G 21/12 |
| | | | | | 198/465.3 |
| 6,382,393 B2 | | 5/2002 | Itoh et al. | | |
| 6,505,733 B2 | | 1/2003 | Troupos et al. | | |
| 6,622,989 B2 | * | 9/2003 | Schiesser | ............... | B65G 25/02 |
| | | | | | 254/124 |
| 6,644,459 B2 | | 11/2003 | van Leeuwen et al. | | |
| 6,938,751 B1 | | 9/2005 | Eubanks et al. | | |
| 7,178,659 B2 | | 2/2007 | Evans et al. | | |

(Continued)

OTHER PUBLICATIONS

Wikipedia, "Single- and double-acting cylinders", Jun. 2016, Wikipedia. https://en.wikipedia.org/w/index.php?title=Single-_and_double-acting_cylinders&oldid=561920128.*

(Continued)

*Primary Examiner* — Mark A Deuble
(74) *Attorney, Agent, or Firm* — Gardner, Linn, Burkhart & Flory, LLP

(57) ABSTRACT

A right angle transfer and method of transferring articles includes a plurality of conveying members that define a conveyance surface and are driven to convey objects in a conveyance direction and a plurality of diverting members. The diverting members are driven to divert objects at an angle from the conveyance surface. A frame mounts the diverting members for general vertical movement with respect to the conveying members. A lifting system including a plurality of spaced apart vertical actuators selectively raises and lowers the frame with respect to the conveying members. Each of the vertical actuators may include a cylinder that is positively driven in each of opposite directions by application of a fluid to opposite sides of the cylinder in order to positively drive the frame to both a raised state and a lowered state. The diverting members may be driven prior to being vertically moved into contact with an article being diverted.

11 Claims, 4 Drawing Sheets

(56) References Cited

U.S. PATENT DOCUMENTS

| | | |
|---|---|---|
| 7,383,935 B2 | 6/2008 | Tasma et al. |
| 7,681,710 B2 | 3/2010 | Kuhn et al. |
| 8,272,496 B2 * | 9/2012 | Itoh .................. B65G 47/54 198/370.1 |
| 2014/0041989 A1 | 2/2014 | Wallace |

OTHER PUBLICATIONS

International Search Report (Form PCT/ISA/210) and Written Opinion of the International Searching Authority (Form PCT/ISA/237) from corresponding Patent Cooperation Treaty Application No. PCT/US2015/043953, mailed Oct. 28, 2015.

* cited by examiner

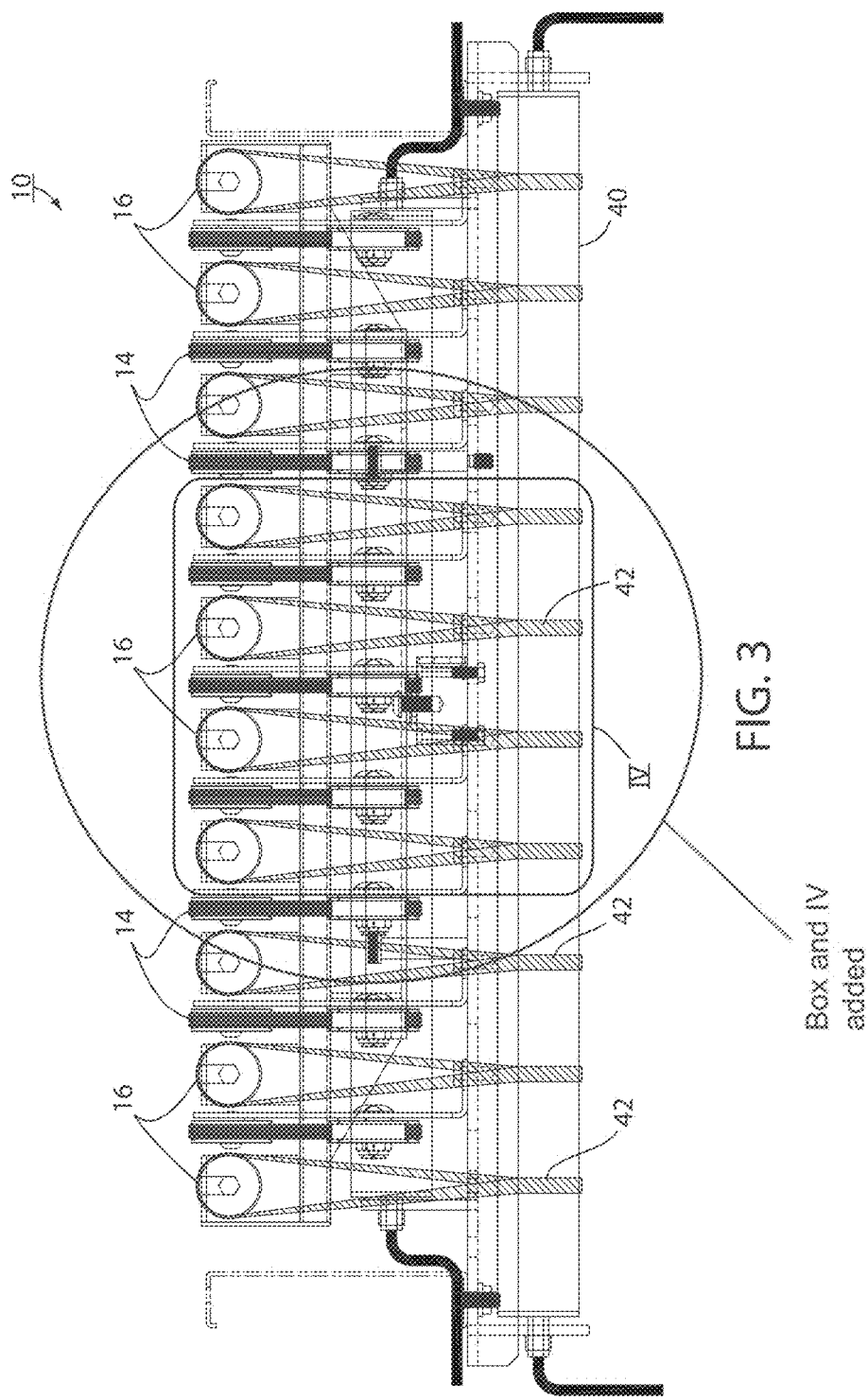

US 9,469,486 B2

RIGHT ANGLE TRANSFER

CROSS REFERENCE TO RELATED APPLICATION

This application claims priority from U.S. patent application Ser. No. 62/037,800, filed on Aug. 15, 2014, the disclosure of which is hereby incorporated herein by reference.

BACKGROUND OF THE INVENTION

The present invention is directed to a diverter mechanism that is adapted to selectively transferring articles from a conveying surface and, in particular, to a right angle transfer mechanism that is adapted to selectively transferring articles at a 90-degree angle.

Because a right angle transfer requires that the motion of an article be changed from a forward motion to a lateral motion, it is important to be able to carry out the transfer as quickly as possible because it is necessary to leave gaps between articles so that an article can be transferred without affecting the forward motion of leading and trailing articles. The faster the transfer, the smaller the gaps and the greater article throughput to the conveyor line. Also, it is desirable to be able to divert a wide range of articles having different surface characteristics in order to increase the flexibility of the system.

SUMMARY OF THE INVENTION

The present invention provides a right angle transfer that is capable of transferring articles from a conveying surface at a very high rate. In the illustrated embodiments, a divert rate of up to 65 cartons per minute can be achieved. The present invention is also capable of handling a wide range of articles having varying surface characteristics.

A right angle transfer and method of transferring articles, according to an aspect of the invention, includes a plurality of conveying members that define a conveyance surface and are driven to convey objects in a conveyance direction and a plurality of diverting members. The diverting members are driven to divert objects at an angle from the conveyance surface. A frame mounts the diverting members for general vertical movement with respect to the conveying members. A lifting system including a plurality of spaced apart vertical actuators selectively raises and lowers the frame with respect to the conveying members. Each of the vertical actuators includes a cylinder that is positively driven in each of opposite directions by application of a fluid to opposite sides of the cylinder in order to positively drive the frame to both a raised state and a lowered state.

Each of the vertical actuators may include a motion damping member, such as a coil spring, to dampen oscillation from motion of the cylinder. Each of the vertical actuators may include a bushing sliding along a shaft. The frame may be rectilinear in footprint with one of the vertical actuators at each corner of the frame. The diverting members may be driven prior to being vertically moved into contact with an article being diverted and may be constantly driven. The diverting members may be driven rollers and may be driven by a motorized roller having a motor mechanism internal to a roller shell.

The conveying members may be driven belts and may be driven by a motorized roller having a motor mechanism internal to a roller shell. The fluid may be compressed air.

A right angle transfer and method of transferring articles, according to an aspect of the invention, includes a plurality of conveying members that define a conveyance surface and are driven to convey objects in a conveyance direction and a plurality of diverting members. The diverting members are driven to divert objects at an angle from the conveyance surface. The diverting members are driven prior to being vertically moved into contact with an article being diverted. A frame mounts the diverting members for general vertical movement with respect to the conveying members. A lifting system including a plurality of spaced apart vertical actuators selectively raises and lowers the frame with respect to the conveying members.

The diverting members may be constantly driven. The diverting members may be driven rollers and may be driven by a motorized roller having a motor mechanism internal to a roller shell. The conveying members may be driven belts and may be driven by a motorized roller having a motor mechanism internal to a roller shell.

These and other objects, advantages and features of this invention will become apparent upon review of the following specification in conjunction with the drawings.

BRIEF DESCRIPTION OF THE DRAWINGS

FIG. 3 is an end elevation view of the right angle transfer in FIG. 1;

DESCRIPTION OF THE PREFERRED EMBODIMENT

Figure 1:
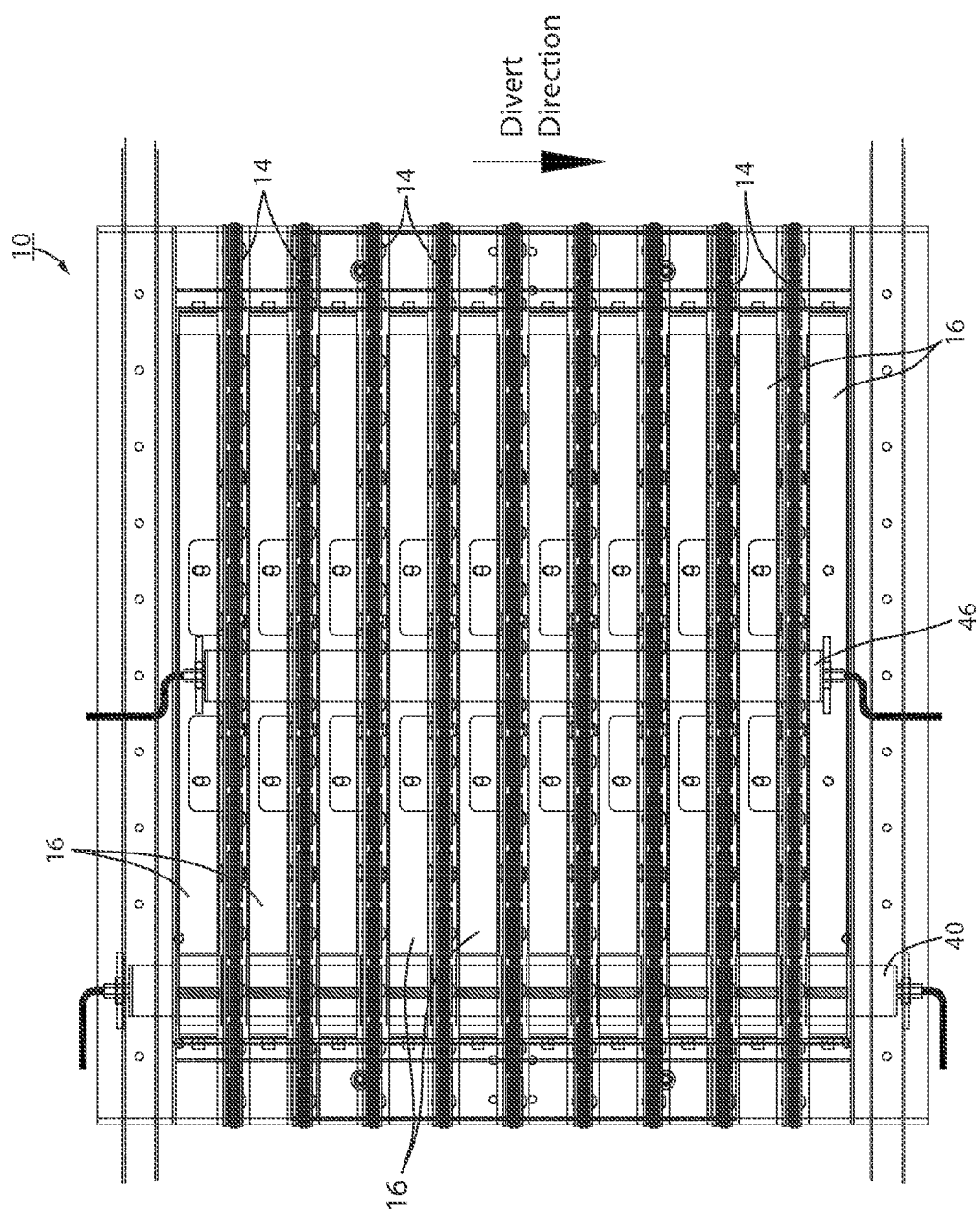
FIG. 1 is a top plan view of a right angle transfer according to an embodiment of the invention.
Figure 2:
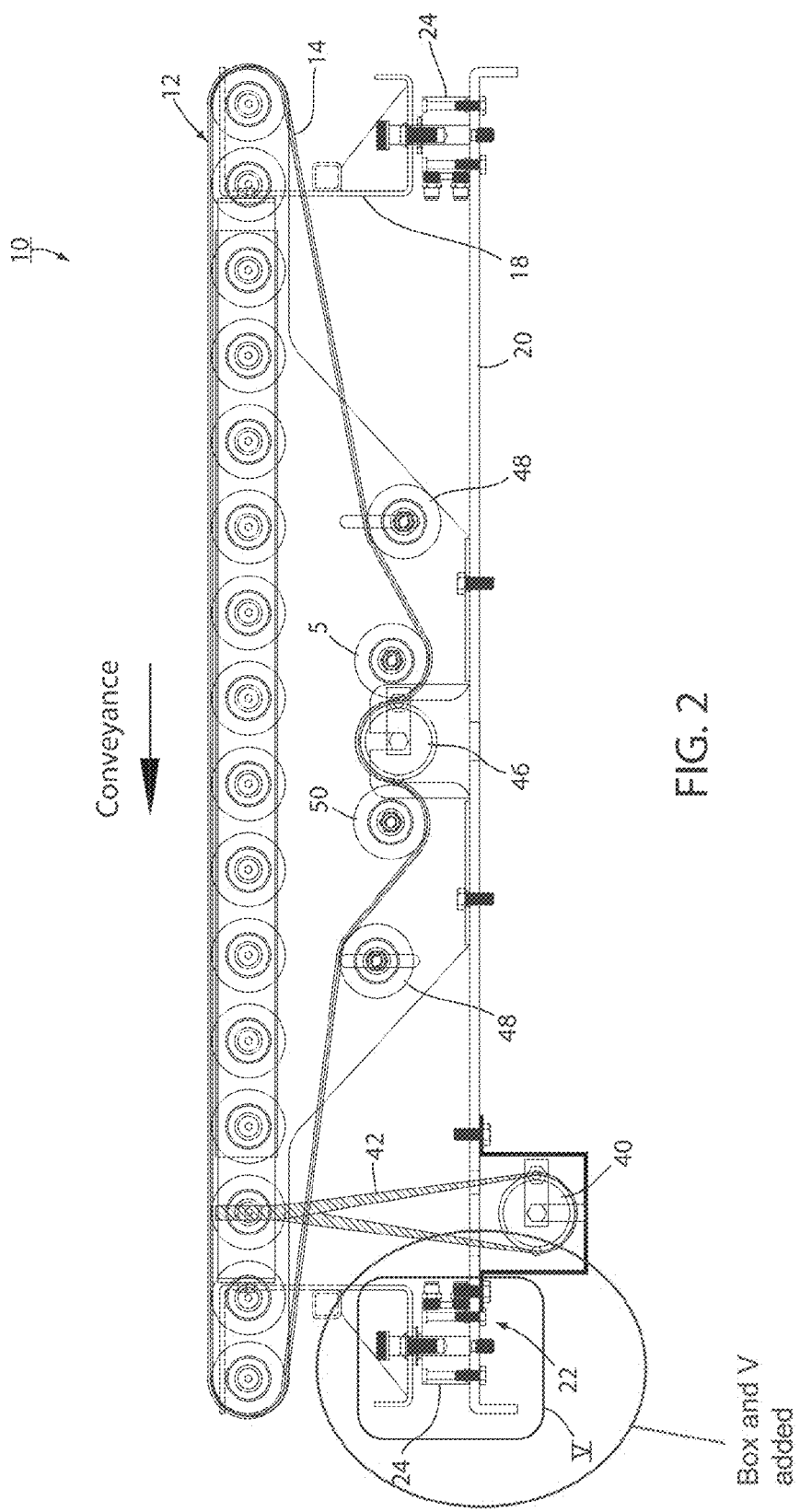
FIG. 2 is a side elevation view of the right angle transfer in FIG. 1.
Figure 5:
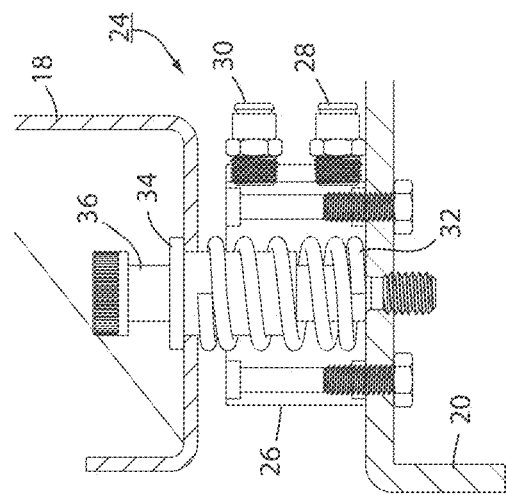
FIG. 5 is an enlarged view of the area designated by V in FIG. 2.
Figure 4:
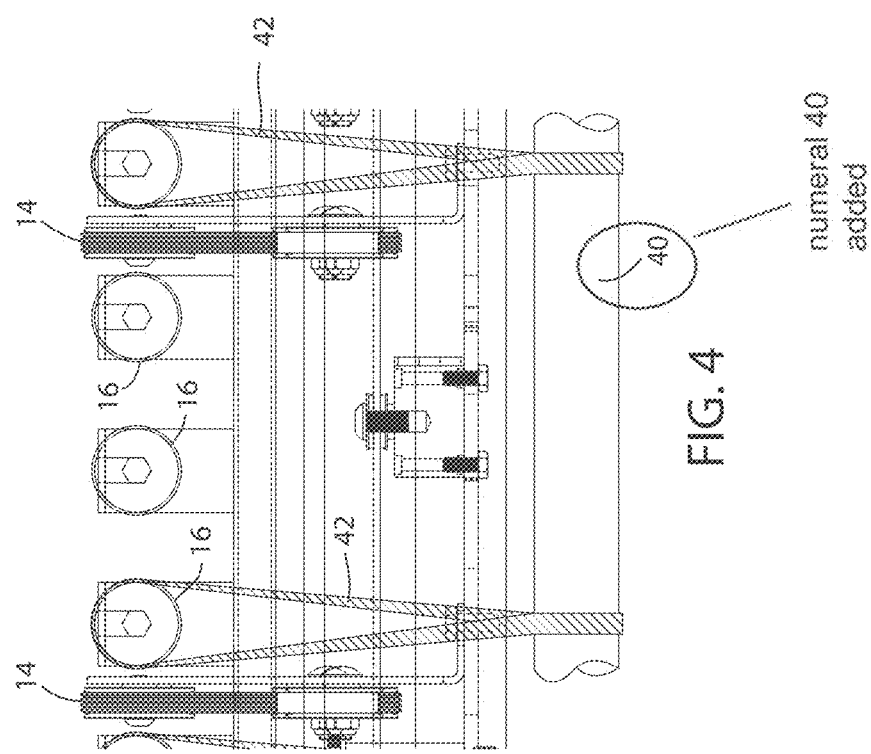
FIG. 4 is an enlarged view of the area designated by IV in FIG. 3.

Referring now to the drawings and the illustrative embodiments depicted therein, a right angle transfer 10 includes a plurality of conveying members 14 that define a conveyance surface 12 that are driven to convey objects in a conveyance direction. Conveyance surface 12 is a portion of a conveyance surface defined by a conveyor (not shown) that supplies articles to the right angle transfer and conveys articles away from the right angle transfer that are not diverted. Right angle transfer 10 further includes a plurality of diverting members 16 that are driven to divert objects at an angle, illustrated as a right angle, from conveyance surface 12. A frame 18 mounts diverting members 16 for general vertical movement with respect to conveying members 14. Conveying members 14 do not move vertically. A lifting system, generally shown at 22, is between frame 18 and a base 20 to selectively elevate and lower frame 18 and, therefore, divert members 16 with respect to conveying members 14. Lifting system 22 is made up of a plurality of spaced apart vertical actuators 24 located at the four (4) corners of rectilinear frame 18 that are actuated at the same time in order to selectively raise frame 18 with respect to conveying members 14 and are de-actuated at the same time to lower frame 18.

Each vertical actuator 24 includes a cylinder 26 that is positively driven in each of opposite directions by application of a fluid through a raise port 28 to one side of cylinder 26 in order to positively drive frame 18 upwardly to a raised state and by application of a fluid to a lower port 30 to an opposite side of cylinder 26 in order to positively drive frame 18 downwardly to a lowered state. In this manner, the cylinder is positively driven in opposite directions so that frame 18 is lowered affirmatively rather than merely by gravity. This provides for a faster raise/lower cycle of frame 18 and diverting members 16 supported by the frame. Each vertical actuator 24 includes a motion damping member, such as a coil spring 32, to dampen oscillation from motion of cylinder 26. Thus, cylinder 26 and damping member 32 are tuned together to provide a smooth operation of the vertical actuator in order to minimize the time it takes for the actuator to change from one stable state to another stable state. Each vertical actuator 24 includes at least one bushing 34 sliding along a shaft 36 in order to provide stable yet low friction motion.

Diverting members 16 are driven prior to being vertically moved into contact with an article being diverted. In the illustrated embodiment, diverting members 16 are constantly driven whether in an elevated or lowered position. In this manner, as soon as lifting system 22 elevates diverting members 16 above conveying members 14 and into contact with an article, the diverting of the article commences without a delay needed to begin rotation of the diverting members. In the illustrated embodiment, diverting members 16 are driven rollers that are driven by a motorized roller 40 of the type known in the art as having a motor mechanism internal to a roller shell. Also, by having motorized roller 40 rotating continuously, there is no need for the roller to come up to speed under a loaded state thereby limiting the need for extensive start-up torque. Diverting members 16 are drivingly connected with motorized roller 40 by separate connecting bands 42. Because connecting bands 42 need to be occasionally replaced, motorized roller 40 is mounted separate from base 20 and frame 18. This allows motorized roller 40 to be removed without the need to separate base 20 and frame 18 thereby facilitating replacement of bands 42 without the need for further disassembly of right angle transfer 10.

In the illustrated embodiment conveying members 14 are endless driven belts. Conveying members 14 are driven by a motorized roller 46 of the type known in the art having a motor mechanism internal to a roller shell. Because they make up a portion of a continuous article conveying surface, conveying members 14 rotate continuously to convey articles past the diverting members if the articles are not being diverted. Conveying member belts are snubbed against motorized roller 46 by a pair of stationary reversing rollers 50 and a pair of tensioning rollers 48.

In the illustrated embodiment, the actuation fluid for actuators 24 is compressed air. However, it could alternatively be hydraulic fluid, or the like. In some embodiments, actuators 24 may be electrically driven.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A right angle transfer, comprising:
   a plurality of conveying members that define a conveyance surface that are driven to convey objects in a conveyance direction;
   a plurality of diverting members that are driven to divert objects at an angle from said conveyance surface;
   a frame that mounts said diverting members for general vertical movement with respect to said conveying members; and
   a lifting system, said lifting system comprising a plurality of spaced apart vertical actuators that are adapted to selectively raise and lower said frame with respect to said conveying members, wherein each of said vertical actuators comprising a cylinder that is positively driven in each of opposite directions by application of a fluid to opposite sides of the cylinder in order to positively drive said frame to both a raised state and a lowered state wherein each of said vertical actuators includes a motion damping member to dampen oscillation from the motion of said cylinder.

2. The transfer as claimed in claim 1 wherein said damping member comprises a spring.

3. The transfer as claimed in claim 1 wherein each of said vertical actuators comprises a bushing sliding along a shaft.

4. The transfer as claimed in claim 1 wherein said frame is rectilinear in footprint and including one of said vertical actuators at each corner of said frame.

5. The transfer as claimed in claim 1 wherein said diverting members are driven prior to being vertically moved into contact with an article being diverted.

6. The transfer as claimed in claim 5 wherein said diverting members are constantly driven.

7. The transfer as claimed in claim 5 wherein said diverting members comprise driven rollers.

8. The transfer as claimed in claim 5 wherein said diverting members are driven by a motorized roller having a motor mechanism internal to a roller shell.

9. The transfer as claimed in claim 5 wherein said conveying members comprise driven belts.

10. The transfer as claimed in claim 9 wherein said conveying members are driven by a motorized roller having a motor mechanism internal to a roller shell.

11. The transfer as claimed in claim 1 wherein said fluid comprises compressed air.

\* \* \* \* \*